United States Patent
Desai et al.

(10) Patent No.: US 10,489,815 B1
(45) Date of Patent: Nov. 26, 2019

(54) INDIVIDUAL USE CODE FOR MULTIPLE USERS IN A LOYALTY PROGRAM

(75) Inventors: Niket Desai, San Francisco, CA (US); Reed Morse, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 1040 days.

(21) Appl. No.: 13/353,312

(22) Filed: Jan. 18, 2012

(51) Int. Cl.
    *G06Q 30/02* (2012.01)

(52) U.S. Cl.
    CPC .............. *G06Q 30/0226* (2013.01)

(58) Field of Classification Search
    USPC .................................... 705/7.11–7.42
    See application file for complete search history.

(56) References Cited

U.S. PATENT DOCUMENTS

| | | | | |
|---|---|---|---|---|
| 5,025,372 A * | 6/1991 | Burton | G06Q 20/387 | 705/14.17 |
| 6,018,723 A * | 1/2000 | Siegel | G06Q 20/10 | 705/38 |
| 6,026,370 A * | 2/2000 | Jermyn | G06Q 20/202 | 235/375 |
| 6,061,660 A * | 5/2000 | Eggleston | G06Q 30/02 | 705/14.12 |
| 6,119,933 A * | 9/2000 | Wong | G06Q 20/14 | 235/380 |
| 6,434,534 B1 * | 8/2002 | Walker | G06Q 20/10 | 705/14.13 |
| 7,359,866 B2 * | 4/2008 | Farat | G06Q 30/02 | 705/14.27 |
| 7,398,225 B2 * | 7/2008 | Voltmer | B01J 23/6562 | 705/14.27 |
| 7,424,441 B2 * | 9/2008 | George | G06Q 20/10 | 235/381 |
| 7,613,629 B2 * | 11/2009 | Antonucci | B01J 23/6562 | 705/14.27 |
| 7,752,134 B2 * | 7/2010 | Spear | G06Q 10/0875 | 705/41 |
| 7,860,934 B1 * | 12/2010 | Wolfe | G06Q 10/107 | 705/40 |
| 7,908,159 B1 * | 3/2011 | Ordonez | G06Q 10/063 | 705/7.33 |
| 7,926,711 B2 * | 4/2011 | Taylor | G06Q 20/10 | 235/375 |

(Continued)

OTHER PUBLICATIONS

U.S. Appl. No. 13/436,929, filed Mar. 31, 2012.

(Continued)

*Primary Examiner* — Mehmet Yesildag
(74) *Attorney, Agent, or Firm* — Johnson, Marcou & Isaacs, LLC

(57) ABSTRACT

A single code can be used only one time by each of multiple users. A user visits a merchant location and wants to sign up for a loyalty program. The merchant issues the user a one-time code, such as a QR code. The user connects to a loyalty program system to download the loyalty application. The user downloads the loyalty application and enters the code into the application. The user receives a "punch" for the loyalty program based on the code. The server operating on the loyalty program system verifies that the punch created is the first and only punch created by the one-time code. If the code has been previously used for the particular user, the server does not create an additional punch.

13 Claims, 2 Drawing Sheets

(56) References Cited

U.S. PATENT DOCUMENTS

| | | | |
|---|---|---|---|
| 7,933,841 B2* | 4/2011 | Schmeyer | G06Q 10/02 705/14.27 |
| 7,993,197 B2 | 8/2011 | Kaminkow | |
| 8,050,968 B2* | 11/2011 | Antonucci | B01J 23/6562 705/14.28 |
| 8,116,730 B2* | 2/2012 | Smith | G06Q 10/06316 235/380 |
| 8,150,844 B2 | 4/2012 | Redstone et al. | |
| 8,387,858 B2* | 3/2013 | Bohn | G06Q 10/087 235/375 |
| 2002/0082920 A1 | 6/2002 | Austin et al. | |
| 2002/0133400 A1* | 9/2002 | Terry | G06Q 30/02 705/14.17 |
| 2003/0144935 A1* | 7/2003 | Sobek | G06Q 20/04 705/35 |
| 2004/0054581 A1* | 3/2004 | Redford | G06Q 20/387 705/14.23 |
| 2004/0111360 A1 | 6/2004 | Albanese | |
| 2004/0128197 A1 | 7/2004 | Bam et al. | |
| 2004/0249710 A1* | 12/2004 | Smith | G06Q 20/223 705/14.27 |
| 2005/0131792 A1* | 6/2005 | Rowe | G06Q 40/00 705/35 |
| 2005/0251446 A1* | 11/2005 | Jiang | G06Q 20/06 705/14.38 |
| 2006/0011719 A1 | 1/2006 | Lehtonen et al. | |
| 2006/0224454 A1* | 10/2006 | Kantor | G06Q 30/02 705/14.3 |
| 2006/0237531 A1 | 10/2006 | Heffez et al. | |
| 2006/0259362 A1* | 11/2006 | Cates | G06Q 30/02 705/14.17 |
| 2008/0133350 A1* | 6/2008 | White | G06Q 20/06 705/14.27 |
| 2008/0248815 A1 | 10/2008 | Busch | |
| 2009/0037275 A1 | 2/2009 | Pollio | |
| 2009/0048926 A1* | 2/2009 | Salesky | G06Q 20/10 705/14.13 |
| 2009/0063351 A1* | 3/2009 | Schmeyer | G06Q 10/02 705/64 |
| 2009/0191933 A1 | 7/2009 | French | |
| 2009/0289111 A1 | 11/2009 | Motycka et al. | |
| 2009/0299844 A1 | 12/2009 | Reilly et al. | |
| 2010/0114661 A1 | 5/2010 | Alderfer et al. | |
| 2010/0114677 A1* | 5/2010 | Carlson | G06Q 30/02 705/14.1 |
| 2010/0125490 A1 | 5/2010 | Kiciman et al. | |
| 2010/0287039 A1 | 11/2010 | Telles | |
| 2010/0312629 A1 | 12/2010 | Wolf et al. | |
| 2011/0082731 A1 | 4/2011 | Kepecs | |
| 2011/0246284 A1 | 10/2011 | Chaikin et al. | |
| 2011/0270665 A1 | 11/2011 | Kim et al. | |
| 2011/0270720 A1 | 11/2011 | Manohar | |
| 2012/0041808 A1* | 2/2012 | Hofer | G06Q 20/32 705/14.17 |
| 2012/0109734 A1* | 5/2012 | Fordyce, III | G06Q 20/10 705/14.25 |
| 2012/0166267 A1 | 6/2012 | Beatty et al. | |
| 2012/0166270 A1 | 6/2012 | Coppinger | |
| 2012/0215605 A1 | 8/2012 | Gardner et al. | |
| 2012/0238337 A1 | 9/2012 | French | |
| 2012/0239474 A1 | 9/2012 | Healy et al. | |
| 2012/0253914 A1 | 10/2012 | Black | |
| 2012/0316945 A1 | 12/2012 | Wolf et al. | |
| 2013/0054470 A1 | 2/2013 | Campos et al. | |
| 2014/0310086 A1* | 10/2014 | Fordyce | G06Q 10/00 705/14.27 |

OTHER PUBLICATIONS

U.S. Appl. No. 13/046,663, filed Mar. 11, 2011.
U.S. Appl. No. 13/353,312, filed Jan. 18, 2012.
U.S. Appl. No. 13/486,799, filed Jun. 1, 2012.
U.S. Appl. No. 13/540,379, filed Jul. 2, 2012.
Reinhardt, "U.S. Office Action issued in copending U.S. Appl. No. 13/715,543, filed Dec. 14, 2012", dated May 8, 2013, 10 pages.
Schmucker, "U.S. Office Action issued in co-pending U.S. Appl. No. 13/486,799, filed Jun. 1, 2012", dated Nov. 6, 2014, 27 pages.
Schmucker, "U.S. Office Action issued in co-pending U.S. Appl. No. 13/486,799, filed Jun. 1, 2012", dated Feb. 26, 2015, 34 pages.
Vyas, "U.S. Office Action issued in copending U.S. Appl. No. 13/594,748, filed Aug. 24, 2012", dated Jun. 19, 2013, 12 pages.

\* cited by examiner

INDIVIDUAL USE CODE FOR MULTIPLE USERS IN A LOYALTY PROGRAM

TECHNICAL FIELD

The present disclosure relates generally to loyalty programs, and more particularly to using a single reward code multiple times but only once by each individual in a loyalty program.

BACKGROUND

Loyalty programs come in many forms. Any program that allows a user to earn points or rewards for every purchase or qualifying event is a form of loyalty program. Examples might include a program such as a frequent flyer program that awards points for every mile traveled. Another example might be a "buy four, get the fifth free" type promotion at a coffee shop or a hair salon. Another example might be a program at a grocery store that awards points for every dollar spent. The goal of loyalty programs is to give a user an incentive to return to the merchant frequently and to purchase promoted items.

Many different processes exist to log a user's purchases into a loyalty program. Users may swipe a card at a point of sale terminal to sign in to the program. Some loyalty programs are tracked by a credit card or other financial account. The simplest logging program is a punch card. With a punch card, a merchant can "punch" a card with a stamp or a hole-puncher or any other manner of logging a loyalty instance.

A "punch" can include any suitable method and process used to log a user's loyalty instance. For example, every time a user buys a coffee in a "buy four, get the fifth free," the user will receive a "punch." Every time a user shops at a grocery store and logs a product purchase, the user will log a "punch." The term "product(s)" should be interpreted to include tangible and intangible products, as well as services.

The increase in the use of Smartphones and other mobile devices in financial transactions, has led many merchants and users to desire to keep their loyalty programs on applications operating on mobile devices or in another digital format, for example, "online." Users can employ the mobile devices to scan a barcode or a quick response ("QR") code to track that a user has made a qualifying purchase.

To use a mobile device with a loyalty program, a user may need to download an application. While a loyalty application may be available for the user to download from a loyalty program system, the user may not desire to perform the application download while in a merchant location at a point of sale device. For example, the user may not want to wait for the application to download while in line at a merchant. Alternatively, the user may prefer to download the application while on the user's home Wi-Fi or the user may desire time to consider the benefits of the loyalty program. While the user may not want to wait for a download, the user also may not want to sacrifice the qualifying punch from the visit.

If the user declines to download a loyalty application, the merchant may desire to offer the user an incentive to download the application later and also to reward the user for the initial purchase or for the progression earned through a specific action, for example, visiting the merchant's location.

For these reasons and others, the users desire a manner of obtaining an initial loyalty punch even if the user has not downloaded the loyalty application.

SUMMARY

The present invention provides a computer-implemented method to use a one-time code to initiate a loyalty program. A user visits a merchant location and wants to sign up for a loyalty program. The merchant issues the user a one-time code, such as a QR code. The user connects to a loyalty program system ("LPS") to download the loyalty application. The user downloads the loyalty application and scans the QR code into the application. The server operating on the LPS verifies that providing a punch based on the QR code will be the first and only punch created for the one-time QR code for that particular user. If so, the user receives a punch. If the QR code has been previously used for that particular user, the server does not record an additional punch. In addition to a QR code, other methods may be used to distribute the code, such as a bar code, NFC tag, or other machine-readable method, or by distribution of a written code to be input by the user.

Another aspect of the present invention provides a computer program product that is installed on a server located in a LPS to use a one-time code to initiate a loyalty program. The computer program product includes a non-transitory computer-readable storage device having computer-readable program instructions stored therein. The computer-readable program instructions include computer program instructions for issuing a one-time QR code to a merchant; supplying a loyalty application to a user device; receiving a QR code punch request from a user device; verifying that the punch request is the first and only punch request using the one-time QR code; and refusing any subsequent punch requests using the one-time QR code from the user.

Another aspect of the present invention provides a system to use a one-time code to initiate a loyalty program. The system includes a loyalty application located on a user's mobile device and logically coupled to a digital wallet application. The system also includes a server, which may be operating on a LPS. The loyalty application may be configured to receive QR codes to receive and transmit a punch. The LPS server may be configured to receive punch requests from a loyalty application; access the user account; receive the one-time QR code associated with the request; record the punch if the one-time QR code has not been used in any previous punch requests; and refuse the punch if the one-time QR code has been used in any previous punch requests.

DETAILED DESCRIPTION OF EXEMPLARY EMBODIMENTS

Overview

Figure 1:
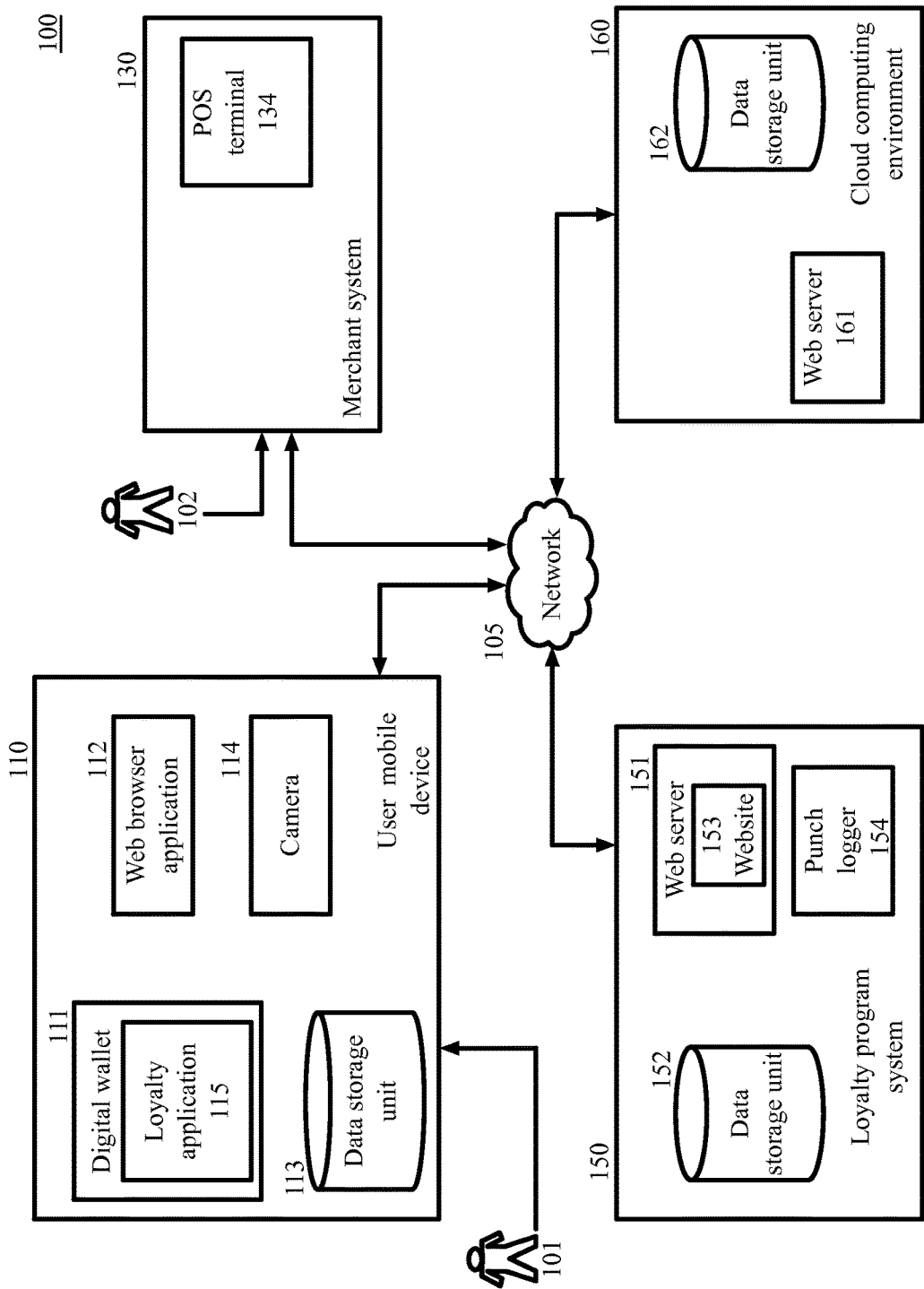
FIG. 1 is a block diagram depicting an operating environment of a loyalty application, in accordance with certain exemplary embodiments.

The present invention provides a computer-implemented method to use a one-time quick response ("QR") or other code to initiate a loyalty program. A user with a mobile user network device visits a merchant location and selects a product for purchase. The merchant may be offering an incentive loyalty program for which the user qualifies. Examples of loyalty programs may include, but would not be limited to, frequent shopper programs, "buy two get one free" type incentives, reward points programs, or any other type of program or incentive that will drive a customer to remain loyal to a merchant.

In the exemplary embodiment, the merchant offers the user the opportunity to join the loyalty program by maintaining a loyalty application on the user's mobile device. The program may require that a user download the loyalty application on the user device to join the program. The user may have many reasons not to download and install the loyalty application while at the merchant location. The user may prefer to download at a later time to avoid mobile network usage fees, to avoid a delay at the merchant point of sale ("POS") terminal, to further investigate the program, or for any other reason.

To encourage the user to download the application and join the loyalty program, the merchant may offer the user an opportunity to join the program at a later date while still obtaining the initial punch from the purchase. The merchant may offer the user a one-time code to record a punch after downloading the loyalty application. Alternatively, the one-time code may be embodied as any other machine-readable identifier, such as a barcode, or as a numerical code. The one-time code may be printed on a card or flyer to be given to the user or may be transmitted in any other manner such as an email, text, or other delivery method.

The same one-time code may be issued to many different users. A unique code for each user is not required. Additionally, the merchant may issue the one-time code to the user for reasons other than to initiate the loyalty program. For example, the merchant may issue the card to a user already belonging to the program as an additional reward or for any other reason. The user may input the one-time code and receive a punch at a time other than initiation of the program.

The user may navigate on a web browser application on the user device to a website of the loyalty program system ("LPS") to download the loyalty application. The web address for the loyalty program may be printed on a card containing the code. Additionally or alternatively, the code, when scanned, may direct a user device to the LPS website. Once at the website, the user may download and install the loyalty application. The user can configure a user account on the web server of the LPS.

The user may scan the one-time code into the loyalty application. The punch logger operating on the LPS can review the account of the user to ensure that the account has never before entered a punch corresponding to the one-time code. If the user has a punch associated with the one-time code entered into the user account, the punch logger can refuse to enter a new punch. If there is no previous punch associated with the one-time code, the punch logger can register the qualifying punch. In this manner, the one-time code may be used only once by each user, while the same code is used by multiple users.

The user may use the loyalty application for each subsequent qualifying visit to the merchant. In a certain embodiment of the invention, the merchant can maintain a QR or other code that is not a one-time use code. The merchant can monitor the code and allow the users to scan the code after each qualifying event.

The digital wallet, the loyalty application, LPS, and punch logger can be embodied as stand-alone application programs or as companion programs to a web browser, for example, as a companion program to a Hypertext Markup Language revision 5 ("HTML5") compliant web browser or other type of web browser having messaging and storage capabilities. While certain embodiments are described in which parts of these components are implemented in software, it will be appreciated that one or more acts or functions of these components may be performed by hardware, software, or a combination thereof, as may be embodied in one or more computing systems.

Users may, in appropriate circumstances, limit or otherwise affect the operation of the features disclosed in the specification. For example, users may be given an initial opportunity to opt-in or opt-out of the collection or use of certain data or the activation of certain features. In addition, a user may change the manner in which the features are employed, including for situations in which a user may have concerns regarding his privacy. Instructions may be provided to users to notify the users regarding policies about the use of information, including personally identifiable information and receipt information, and manners in which the users may affect such use of information.

System Architecture

Turning now to the drawings, in which like numerals represent like (but not necessarily identical) elements throughout the figures, exemplary embodiments of the present invention are described in detail. FIG. 1 is a block diagram depicting an operating environment 100 for a loyalty application, in accordance with certain exemplary embodiments.

Referring to FIG. 1, the exemplary operating environment 100 includes a merchant system 130 operated by a merchant, a loyalty program system ("LPS") 150, a cloud computing environment 160, and a user network device 110 associated with a user 101. The user device 110 may be a mobile device, (for example, notebook computer, tablet computer, netbook computer, personal digital assistant (PDA), video game device, GPS locator device, cellular telephone, smartphone, or other mobile device), or other appropriate technology that includes or is coupled to a web browser application module 112, such as GOOGLE'S CHROME, MICROSOFT'S INTERNET EXPLORER®, or MOZILLA'S FIREFOX®.

The user 101 can use the web browser application 112 to view, download, upload, or otherwise access documents or web pages via a distributed network 105. The network 105 includes a wired or wireless telecommunication system or device by which network devices (including devices 110, 130, 150, and 160) can exchange data. For example, the network 105 can include a local area network ("LAN"), a wide area network ("WAN"), an intranet, an Internet, or any combination thereof. Throughout the discussion of exemplary embodiments, it should be understood that the terms "data" and "information" are used interchangeably herein to refer to text, images, audio, video, or any other form of information that can exist in a computer based environment.

The web browser application 112 can interact with web servers (or other computing devices) connected to the network 105, such as web server 151 of the LPS 150, and the web server 161 of the cloud computing environment 160.

The user network device 110 may include a digital wallet application 111. The digital wallet 111 may encompass any application, hardware, software, or process the user device 110 may employ to assist the user 101 in completing a purchase. The digital wallet 111 can interact with the web browser application 112 or can be embodied as a companion application of the web browser application 112. As a companion application, the digital wallet 111 executes within the web browser application 112. That is, the digital wallet 111 may be an application program embedded in the web browser application 112.

The user device 110 can include a loyalty application 115. The loyalty application 115 can interact with the web browser application 112 or be embodied as a companion application of the web browser application 112 and execute within the web browser application 112. The loyalty application 115 may further be embodied as a companion application of the digital wallet 111 and execute within the digital wallet 111. The loyalty application 115 may employ a software interface for configuration that may open in the digital wallet application 111 or may open in the web browser application 112.

The loyalty application 115 is operable to allow a user 101 to configure an account, use a camera 114 to scan a machine readable code such as a QR code, bar code, or other machine-readable identifier, obtain the code from a near field communication tag, and interact with the LPS 160 to participate in a loyalty program with a merchant 130. The loyalty application 115 is further operable to store loyalty program information in a data storage unit 113 stored on or coupled to the user device 110 or at a cloud computing environment 160.

The user device 110 also includes a data storage unit 113 accessible by the digital wallet 111, the loyalty application 115, and the web browser application 112. The exemplary data storage unit 113 can include one or more tangible computer-readable storage devices. The data storage unit 113 can be stored on the user device 110 or can be logically coupled to the user device 110. For example, the data storage unit 113 can include on-board flash memory and/or one or more removable memory cards or removable flash memory.

The user device 110 also includes a camera 114. The camera 114 may represent any type of image capturing technology that may be employed by the user device 110. The camera 114 may be embodied as a camera, barcode reader, scanner, or any other type of device capable of capturing a machine readable code.

The merchant system 130 represents an entity that offers products for the user 101 to purchase or use. The merchant system 130 includes a point of sale ("POS") terminal 134. The POS terminal 134 may be operated by a salesperson 102 that enters the purchase data into the POS terminal 134 to complete the purchase transaction. The salesperson 102 may assist with the initiation and implementation of a loyalty program.

The cloud computing environment 160 includes the web server 161 and one or more data storage units 162. The cloud computing environment 160 may be provided by the provider of the digital wallet, by a provider of the mobile device, or by another party. In certain exemplary embodiments, multiple cloud computing environments 160 may be employed. For example, a first cloud computing environment may store coupon information and provide access to the coupons from a user device 110 connected to the first cloud computing, and a second cloud computing environment may provide security information, such as lists of non-trusted merchants, to the digital wallet 111. Although the illustrated environment includes a cloud computing environment, other types of computing environments, such as a client-server environment may be used instead.

The LPS 150 is a system to create, manage, distribute, log, and validate loyalty programs. The LPS 150 may be a function of the merchant system 130. The LPS 130 may be an independent system that the merchant 130 uses. The LPS 150 may be an independent distributor, a function of a product manufacturer, a product marketer, or any other system or organization that may manage a loyalty program.

The LPS 150 includes the network device web server 151, one or more data storage units 152, and a punch logger application 154.

The punch logger 154 on the LPS 150 can maintain a loyalty account for each user 101, including the user 101. The punch logger can store (in the data storage unit 152) the punches earned by the user 101 and also the conditions and rewards configured by the merchant system 130 or by the LPS 150. The punch logger 154 can synchronize this information with the loyalty application 115 or the digital wallet 111 periodically, on command (for example, by the user 101), or in response to an update in information at the digital wallet 111 or at the cloud computing environment 160.

The loyalty application 115, digital wallet 111, and the web browser application 112 can interact with the punch logger 154 via the web server 151. The punch logger 154 can provide a user interface via the web server 151 that enables the user 101 to access, view, and/or modify content stored in the user's account using the user device 110 or another device connected to the network 105. The digital wallet 111 can include a user interface for accessing loyalty information stored on the user device 110 or at the cloud computing environment 160 in a meaningful and useful way.

It will be appreciated that the network connections shown are exemplary and other means of establishing a communications link between the computers and devices can be used. Moreover, those having ordinary skill in the art having the benefit of the present disclosure will appreciate that the merchant system 130, LPS 150, cloud computing environment 160, and the user device 110 illustrated in FIG. 1 can have any of several other suitable computer system configurations. For example, a user device 110 embodied as a mobile phone or handheld computer may include more components not described herein or may not include all the components described herein.

The components of the exemplary operating environment 100 are described in further detail hereinafter with reference to the exemplary methods illustrated in FIG. 2.

System Process

Figure 2:
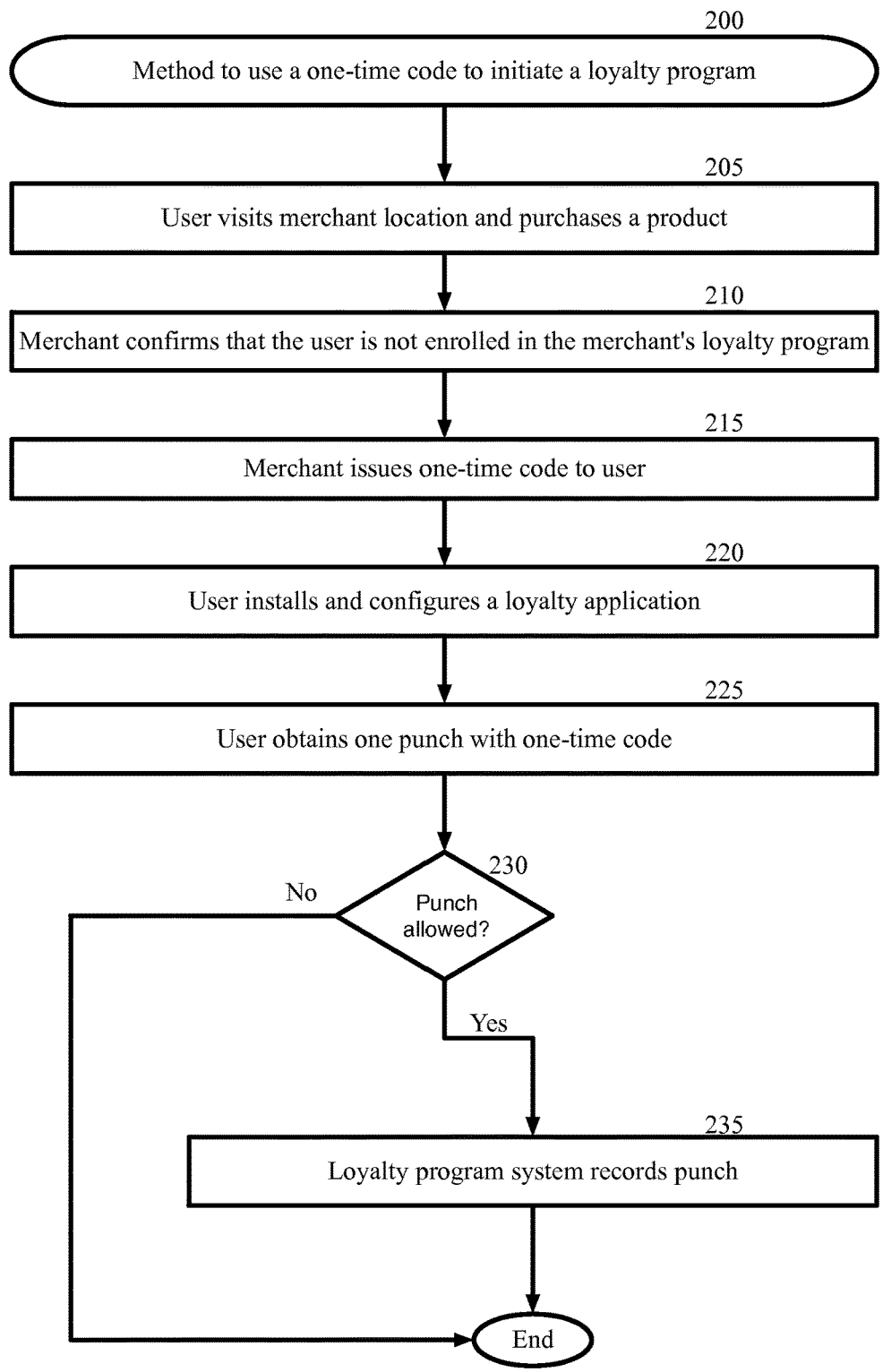
FIG. 2 is a block flow diagram depicting a method to use a one-time code to initiate a loyalty program, in accordance with certain exemplary embodiments.

FIG. 2 is a block flow diagram depicting a method 200 to use a one-time code in a loyalty program, in accordance with certain exemplary embodiments.

With reference to FIGS. 1 and 2, in block 205, a user 101 with a mobile user network device 110 visits a merchant 130 location and selects a product for purchase. The term "product(s)" should be interpreted to include tangible and intangible products, as well as services. The user 101 may approach the point of sale ("POS") terminal 134 of the merchant 130 to make the purchase.

In block 210, the merchant 130 offers an incentive loyalty program for which the user 101 qualifies, but to which the user 101 does not already belong. Examples of loyalty programs may include, but would not be limited to, frequent shopper programs, "buy two get one free" type incentives, reward points programs, or any other type of program or incentive that will drive a customer to remain loyal to a merchant 130. The user 101 may not be required to make a purchase in some loyalty programs. The merchant 130 may issue a punch for any type of action that the merchant 130 may determine is a qualifying action. For example, a religious organization may only require a qualifying visit to earn a punch or a gym may require a user 101 to exercise to earn a punch.

As used throughout the specification, the term "punch" should be interpreted to include all of the available methods and processes used to log a qualifying loyalty instance of a user 101. The punch may be a digital version of a "punch"

on a frequent shopper card. The punch may be a certain quantity of points, purchases, uses, or other suitable incentive for a rewards points program.

In the exemplary embodiment, the merchant 130 offers the user 101 the opportunity to join the loyalty program with a loyalty application 115 on the user's mobile device. The merchant 130 may employ an application that can operate on a mobile device and employ the camera or other machine readable code scanner to allow for electronic logging of punches.

In certain instances, the user 101 may choose not to download the application while at the merchant 130 location. The user 101 may prefer to download at a later time to avoid mobile network usage fees, to avoid a delay at the POS terminal 134 of the merchant 130, to further investigate the program, or for any other reason.

In block 215, the merchant 130 issues the user 101 a one-time code, such as a QR code, to offer the user 101 an incentive to join the loyalty program. The one-time QR code would allow the user 101 the opportunity to download the application at a later time and still receive the punch from the first qualifying purchase. Alternatively, the one-time code may be embodied as any other machine-readable identifier, such as a barcode, an alpha-numerical code, or any other type of identifier.

In exemplary embodiments, the merchant can issue the one-time code to the user 101 by providing a card, flyer, or other document having the code printed thereon. The code can be printed in the form of a number/text string, or a QR code, a barcode, or other machine-readable media. Alternatively, the merchant may display the one-time code and invite the user 101 to operate the user device 110 to capture the one-time code, via entering text/numbers into the user device 110 or scanning the QR code, barcode, or other machine-readable media with the user device 110. Additionally, if the user device 110 is configured with near field communication ("NFC") functionality, the user 101 may "tap" the user device 110 with the POS terminal 134 or other NFC tag to obtain the one-time code.

The same one-time code may be issued to many different users 101. A unique code for each user is not required. Additionally, the merchant 130 may issue the one-time code to the user 101 for reasons other than to initiate the loyalty program. For example, the merchant 130 may issue the code to a user 101 already belonging to the program as an additional reward or for any other reason. The user 101 may input the one-time code and receive a punch at a time other than initiation of the program.

In an alternate embodiment of the invention, the user 101 may not have made the initial qualifying purchase or any other qualifying event. The merchant 130 may desire to increase the membership of the loyalty program and be willing to offer a potential user 101 the opportunity to join the program and earn the first punch even if the user 101 has not made any qualifying purchases. For example, the merchant 130 may distribute one-time QR codes on a sales flyer, on the merchant website, or other marketing literature.

In the exemplary embodiment of the invention, the same one-time code may be issued to many different potential users 101. The invention allows the code to be associated with a particular user account and only redeemed once for each particular user account. Thus, different one-time codes need not be issued to different users 101.

In block 220, the user 101 may navigate on a web browser application on the user device 110 to a website 153 of the LPS 150 to download the loyalty application 115. The web address for the loyalty program may be printed on a card containing the QR code or otherwise contained in the marketing information. Additionally or alternatively, the one-time QR code, when scanned by the user device 110, may direct the user device 110 to the LPS 150 website. Once at the website, the user 101 may download and install the loyalty application 115. The user 101 can configure a user account on the web server 151 of the LPS 150. Alternatively, the loyalty application 115 may be downloaded or transferred to the user device 110 via any other manner such as a download from the website of the merchant 130, a removable flash memory, an email from the merchant 130, or any other manner.

In block 225, the user 101 scans the one-time QR code with the user device 110 and the loyalty application 115 transmits the code to the punch logger 154 operating on the LPS 150. The punch logger 154 associates the punch with the user account. The one-time QR code may be associated with one qualifying instance or more than one. For example, as a further incentive, the LPS 150 may configure the one-time QR code to log two or more punches for the user 101 as a further incentive to join the loyalty program or as an additional reward to the user 101. Alternatively, for a rewards points type loyalty program, the one-time QR code may be configured to supply a certain number of rewards points to the user account. For example, a frequent flyer program may configure the one-time QR code to supply 500 miles to a user account.

The user 101 may employ any other means of entering a code into the loyalty application 115. Any type of machine-readable code may be scanned or otherwise digitally captured by the user device 110. The code may be entered manually by the user 101 on the user interface of the user device 110, such as by entering an alpha-numeric identifier on the keypad or other input mechanism of the user device 110.

If the user 101 has already scanned a machine-readable code or has otherwise input the code into the user device 110, block 225 may be performed using the pre-entered information.

In block 230, the punch logger 154 can review the account of the user 101 to ensure that the account has never before entered a punch corresponding to the one-time QR code. If the user 101 has a punch associated with the one-time QR code entered into the user account, the punch logger 154 can refuse to enter a new punch. In this case, the method 200 can follow the "NO" branch of block 230 to the end of the method 200. If a previous punch associated with the one-time QR code is not present in the user account, the method 200 can follow the "YES" branch of block 230 to block 235.

In an exemplary embodiment, upon use of the one-time code, the punch logger 154 stores an indication in the user's 101 account maintained at the data storage unit 152 of the loyalty program system 150. The indication notes that the user 101 has used the one-time code and that the user 101 may not further use the one-time code. Then, in block 230, the punch logger 154 can identify the account associated with the user 101, determine whether the indication for the particular one-time code is associated with the account, and, if so, reject the punch. Alternatively, if the identification for the particular one-time code is not associated with the user account, the punch logger 154 may allow the punch. In this manner, multiple users can use the code, but each user can use the code only a single time.

Following the "YES" branch of block 230 to block 235, the punch logger 154 can register the qualifying punch to the user account.

The user 101 may use the loyalty application 115 for each subsequent qualifying visit to the merchant 130. In a certain embodiment of the invention, the merchant 130 can maintain a QR or other code that is not a one-time use code. The merchant 130 can monitor the code usage and allow the users 101 to scan the code after each qualifying event. The punch logger 154 can log each qualifying event and alert the loyalty application 115 and the merchant 130 when a user has reached a loyalty reward. For instance, if the user 101 has joined a loyalty program that awards a free coffee after 10 punches, the punch logger 154 can alert the loyalty application 115 that the merchant 130 will award a free coffee on the next user 101 visit.

From block 235, the method 200 ends.

General

One or more aspects of the exemplary embodiments may include a computer program that embodies the functions described and illustrated herein, wherein the computer program is implemented in a computer system that comprises instructions stored in a machine-readable medium and a processor that executes the instructions. However, it should be apparent that there could be many different ways of implementing the exemplary embodiments in computer programming, and the exemplary embodiments should not be construed as limited to any one set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. Moreover, any reference to an act being performed by a computer should not be construed as being performed by a single computer as more than one computer may perform the act. Further, those skilled in the art will appreciate that one or more acts described may be performed by hardware, software, or a combination thereof, as may be embodied in one or more computing systems.

The exemplary methods and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method to provide incentive rewards by using single-use reward codes for multiple consumers in incentive programs, comprising, by one or more computers:
    issuing a machine-readable, single-use identifier associated with an incentive award for an incentive program to a plurality of consumers;
    receiving, from a user computing device associated with a particular consumer that received the issued identifier, the first request comprising the issued identifier scanned by the user computing device;
    in response to receiving the issued identifier, directing the user computing device to a loyalty system to download a loyalty application associated with the incentive program;
    receiving, from the user computing device via the downloaded loyalty application, a first request to apply the incentive reward for the incentive program, the first request comprising the issued identifier scanned by the user computing device and information for the particular consumer;
    determining whether the issued identifier has been used previously for an incentive account associated with the particular consumer;
    first recording the incentive reward in the incentive account associated with the particular consumer in response to a determination that the issued identifier has not been used previously for the incentive account associated with the particular consumer;
    second recording an indication that the incentive reward associated with the single-use identifier has been used for the incentive account associated with the particular one of the consumers in response to the first recording;
    at a time after the second recording, receiving a second request to apply the incentive reward for the incentive program from the user computing device, the second request comprising the issued identifier and the information for the particular consumer
    determining whether the issued identifier has been used previously for the incentive account associated with the particular consumer;
    denying the second request to apply the incentive reward in the incentive account associated with the particular consumer in response to determining that the issued identifier has been used previously for the incentive account associated with the particular consumer; and
    communicating a notification to the user computing device comprising the determination that the issued identifier has been used previously for the incentive account associated with the particular consumer and a denial of the second request.

2. The method of claim 1, wherein the single-use identifier is a QR code.

3. The method of claim 1, wherein the single-use identifier is a barcode.

4. The method of claim 1, wherein the single-use identifier is issued by a near field communication.

5. A computer program product, comprising:
    a non-transitory computer-readable storage device having computer-executable program code embodied thereon for using a one-time code for multiple consumers in an incentive program, the computer-executable program instructions comprising instructions to:

issue a one-time code to a plurality of potential users, the one-time code being a machine-readable identifier and redeemable a single time by any particular user;

receive, from a computing device associated with a particular user, the one-time code scanned by the computing device, wherein an incentive for an incentive program is associated with the one-time code;

in response to receiving the issued one-time code, direct the computing device to a loyalty system to download a loyalty application associated with the incentive program;

receive, from the user computing device via the downloaded loyalty application, a first request to apply the incentive for the incentive program, the first request comprising the issued one-time code scanned by the user computing device and information for the particular user;

determine whether the incentive associated with the one-time code has previously been recorded in a user incentive program account associated with the particular user;

record the incentive in the user account associated with the particular user in response to a determination that the incentive associated with the one-time code has not previously been recorded in the user account associated with the particular user;

receive, from the computing device associated with the particular user and at a time after recording of the indication that the incentive associated with the one-time identifier has been used for the user incentive program account associated with the particular user, a second request to apply the incentive for the incentive program, the second request comprising the issued one-time identifier and the information for the particular user that received the issued one-time identifier;

determine whether the one-time identifier has been used previously for the incentive account associated with the particular one of the consumers;

deny the second request to apply the incentive in the user incentive program account associated with the particular user in response to determining that the one-time identifier has been used previously for the user incentive program account associated with the particular user; and communicate a notification to the computing device associated with the particular user of the determination, the notification comprising a determination that the one-time identifier has been used previously for the user incentive program account and a denial of the second request.

6. The computer program product of claim 5, further comprising computer-executable program code to record an indication that the incentive associated with the one-time code has been used for the user account associated with the particular user in response to recording the incentive in the user account associated with the particular user.

7. The computer program product of claim 5, wherein the machine-readable identifier is a QR code.

8. The computer program product of claim 5 wherein the machine-readable identifier is a barcode.

9. The computer program product of claim 5, wherein the machine-readable identifier originates from a near field communication.

10. A system to use a single-use identifier in a loyalty program, comprising:

a storage resource;

a network module; and a processor communicatively coupled to the storage resource and the network module, wherein the processor executes application code instructions that are stored in the storage resource to cause the system to:

issue a single-use identifier to a plurality of consumers, wherein the single-use identifier is a machine-readable identifier;

associate the single-use identifier with an incentive reward for an incentive program;

receive, from user computing device associated with a particular consumer receiving the single-user identifier, the single-use identifier scanned by the user computing device;

in response to receiving the single-use identifier, direct the computing device to a loyalty system to download a loyalty application associated with the incentive program;

receive, from the user computing device via the downloaded loyalty application, a first request to apply the incentive for the incentive program, the first request comprising the issued single-use identifier scanned by the user computing device and information for the particular user;

determine whether the single-use identifier has been used previously for an incentive account associated with the particular consumer;

first record the incentive reward in the incentive account associated with the particular one of the consumers in response to a determination that the single-use identifier has not been used previously for the incentive account associated with the particular consumer;

second record an indication that the incentive reward associated with the single-use identifier has been used for the incentive account associated with the particular consumer in response to the first recording;

at a time after the second recording, receive a second request to apply the incentive reward for the incentive program from the user computing device, the second request comprising the issued single-use identifier and the information for the particular consumer that received the issued single-use identifier;

determine whether the single-use identifier has been used previously for the incentive account associated with the particular consumer;

deny the second request to apply the incentive reward in the incentive account associated with the particular consumer in response to determining that the single-use identifier has been used previously for the incentive account associated with the particular consumer; and communicate a notification to the user computing device comprising the determination that the single-use identifier has been used previously for the incentive account associated with the particular consumer and a denial of the second request.

11. The system of claim 10, wherein the single-use identifier is a QR code.

12. The system of claim 10, wherein the single-use identifier is a barcode.

13. The system of claim 10, wherein the single-use identifier originates from a near field communication.

\* \* \* \* \*